No. 779,937. PATENTED JAN. 10, 1905.
L. J. HOLT.
FISH LINE BOB.
APPLICATION FILED APR. 9, 1904.

Witnesses
Geo. Ackman Jr.
Frank B. Hoffman

Inventor
L. J. Holt,
By Victor J. Evans
Attorney

No. 779,937.

Patented January 10, 1905.

UNITED STATES PATENT OFFICE.

LEMUEL J. HOLT, OF PHILLIPS, MAINE.

FISH-LINE BOB.

SPECIFICATION forming part of Letters Patent No. 779,937, dated January 10, 1905.

Application filed April 9, 1904. Serial No. 202,401.

*To all whom it may concern:*

Be it known that I, LEMUEL J. HOLT, a citizen of the United States, residing at Phillips, in the county of Franklin and State of Maine, have invented new and useful Improvements in Fish-Line Bobs, of which the following is a specification.

This invention relates to fishing-line bobs, the object of the invention being to provide a simple, cheap, and reliable bob or float, with attached reel and mechanism for controlling the reel, whereby the line may be adjusted in length and wound in or allowed to run out while the device is held in the hand, the said device also comprising means for holding the line at any desired length, so that the bob may be thrown overboard without danger of the full length of line being drawn from the reel by the action of a fish. By reason of the construction, a detailed description of which hereinafter follows, a single fisherman may manage a number of such bobs, and thereby add to his enjoyment and the amount of his catch.

With the above and other objects in view, the nature of which will more fully appear as the description proceeds, the invention consists in the novel construction, combination, and arrangement of parts, as herein fully described, illustrated, and claimed.

Figure 1:
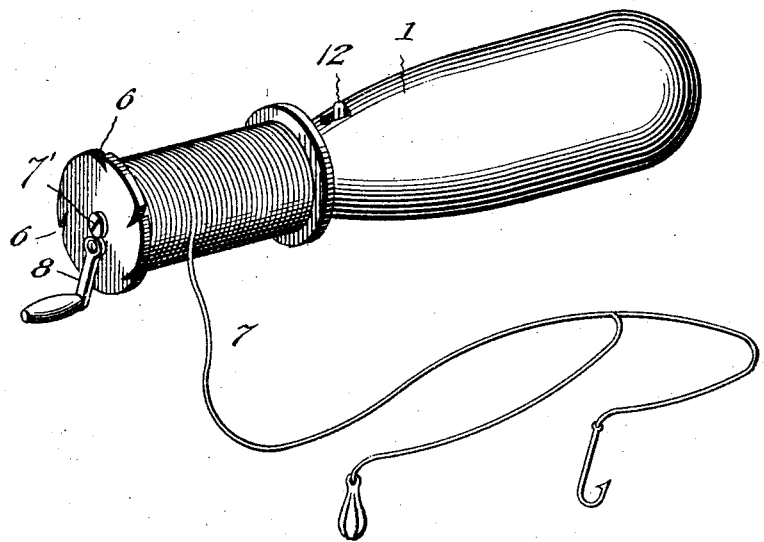
Figure 2:
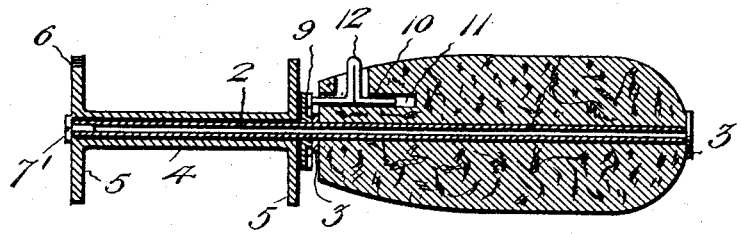
Figure 3:

In the accompanying drawings, Figure 1 is a perspective view of the fish-line bob embodying the present invention. Fig. 2 is a longitudinal section through the same. Fig. 3 is a detailed perspective of the toothed brake.

Like reference-numerals designate corresponding parts in all the figures of the drawings.

The fishing-line bob contemplated in this invention comprises, essentially, a combined bob or float and handle 1, preferably composed of cork or other buoyant material and of any suitable size. Passing centrally and lengthwise through the body of the bob is a shaft, rod, or stem 2, the same being preferably composed of metal and in the form of a tube for the sake of strength and lightness, the bob-handle being held thereon by being confined between collars or shoulders 3 on the stem.

Journaled upon the projecting end of the shaft or stem 2 is a reel 4, comprising the end flanges or heads 5, the outer one of which is provided with inwardly-contracting notches 6, into any one of which the fishing-line (shown at 7) wound upon the reel is adapted to be inserted and gripped to prevent further unwinding of the line from the reel. The reel is held on the stem by means of a screw or other suitable stop 7', connected with the end of the stem. Attached to the outer head of the reel is a crank-handle 8, by means of which the reel may be operated for winding the line thereon. On the opposite or inner head of the reel is secured a toothed disk or cog-wheel 9, the teeth thereof projecting laterally toward the adjacent end of the bob 1, where they are adapted to be engaged by the projecting end of a reciprocatory brake 10, mounted in a recess 11, extending lengthwise of the handle or bob and provided with a laterally-projecting thumb or finger piece 12, by means of which the operator may slide the brake into engagement with the toothed disk 9 to stop the rotation of the reel as the line is paid out.

The device hereinabove described may be used as an extra line by simply leaving the bob where it may be easily pulled from a boat—for example, by a fish impaled on the hook attached to the line—or the bob may be retained in the hand similar to a fishing-rod and manipulated by holding the bob-handle 1 in one hand, leaving the other hand free to manipulate the reel. It has an advantage over the ordinary pole or rod in that when the entire line is unwound from the reel the sportsman may release the bob or allow the same to be drawn overboard by the fish, thereby avoiding snapping the line. The bob, line, and fish may afterward be recovered. When the line is partially wound in, should the fish make a desperate fight the line may be quickly caught in one of the notches, which is in the outer end of the reel, and the whole device again cast overboard until the fish is tired out and easily landed.

It will be obvious that the bob hereinabove described is susceptible of changes in the form, proportion, and minor details of construction, and I therefore reserve the right to make such changes as properly fall within the scope of the appended claims.

Having thus described the invention, what is claimed as new is—

1. A fishing-line bob consisting of a float, a reel mounted on the float and adapted to have a fishing-line wound thereon, and means on the reel for engaging and holding the line.

2. A fishing-line bob comprising a combined handle and float, a reel connected therewith and adapted to have a line wound thereon, said reel being provided with one or more line receiving and gripping notches, substantially as described.

3. A fishing-line bob comprising a combined handle and float, a reel journaled at one end thereof and adapted to have a line wound thereon, means for revolving the reel, and a brake consisting of a roughened disk attached to one end of the reel, and a slide mounted in the handle and adapted to be moved into and out of contact with said disk.

4. A fishing-line bob comprising a combined handle and float having a projecting stem at one end, a reel journaled on said stem and adapted to have a line wound thereon, a toothed disk attached to the reel, and a sliding brake movable in a recess in the handle and provided with a laterally-projecting thumb-piece whereby the brake is adapted to be moved toward and away from the toothed disk.

5. A fishing-line bob comprising a combined float and handle, a tubular stem extending through the same, a reel journaled on the projecting end of said stem, and a sliding brake movable in a recess extending lengthwise of the handle and provided with a laterally-projecting thumb-piece by means of which the brake is adapted to be moved toward and away from the reel, substantially as described.

In testimony whereof I affix my signature in presence of two witnesses.

LEMUEL J. HOLT.

Witnesses:
   De Berna R. Ross,
   Chas. F. Chandler.